COLOR TELEVISION SAMPLING SYSTEM

Filed March 16, 1951 3 Sheets-Sheet 1

INVENTOR.
ROBERT C. MOORE
BY
Allen V. Hazeltine
ATTORNEY

June 30, 1953 R. C. MOORE 2,644,030

COLOR TELEVISION SAMPLING SYSTEM

Filed March 16, 1951 3 Sheets-Sheet 2

INVENTOR.
ROBERT C. MOORE
BY
Allen V. Hazeltine
ATTORNEY

INVENTOR.
ROBERT C. MOORE
BY Allen V. Hazeltine
ATTORNEY

Patented June 30, 1953 2,644,030

UNITED STATES PATENT OFFICE 2,644,030

COLOR TELEVISION SAMPLING SYSTEM

Robert C. Moore, Erdenheim, Pa., assignor to Philco Corporation, Philadelphia, Pa., a corporation of Pennsylvania Application March 16, 1951, Serial No. 215,996

18 Claims. (Cl. 178—5.2)

Figure 1:
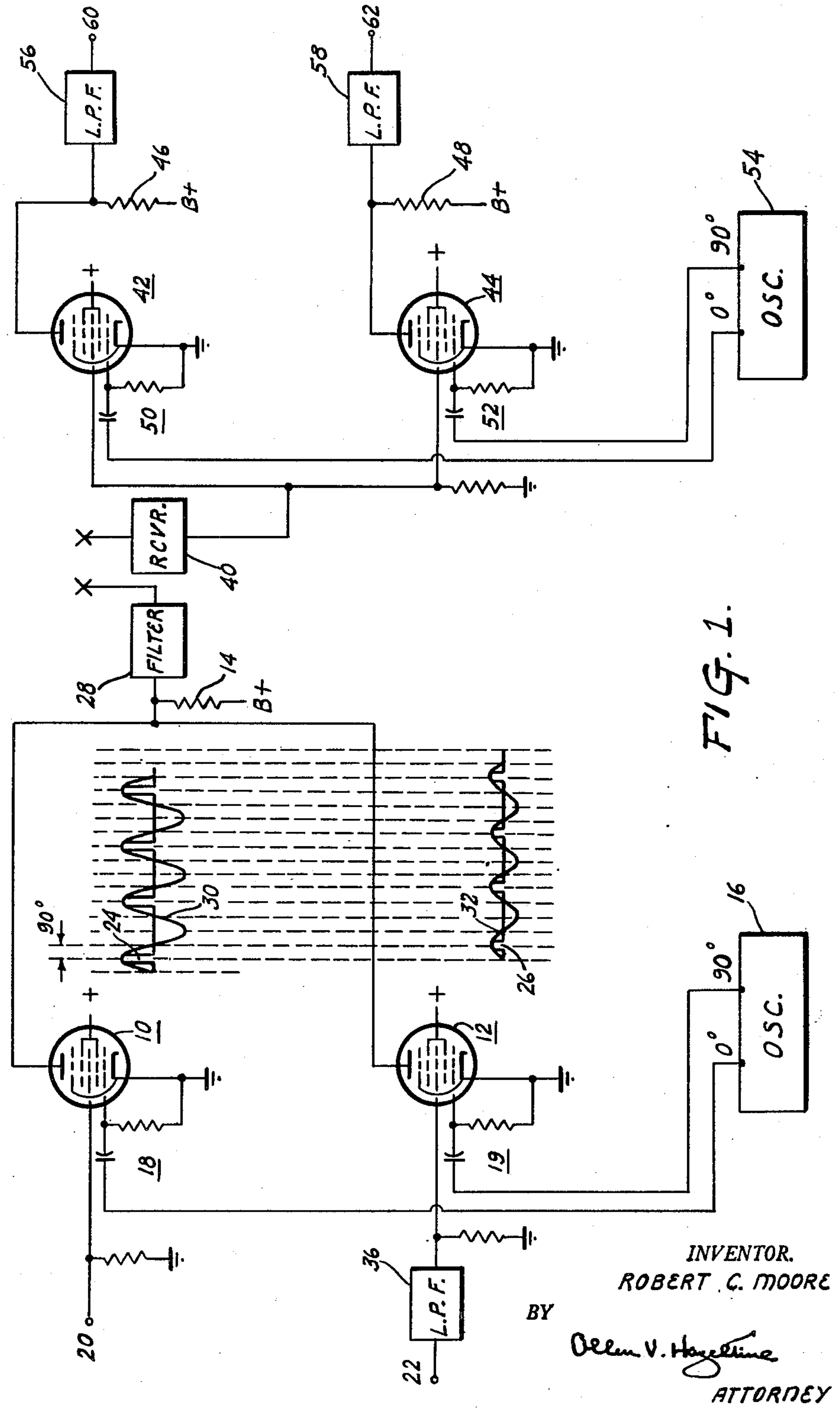

The present invention relates to electrical systems and more particularly to electrical systems for transmitting a plurality of intelligence components over a single channel. The invention is particularly applicable to and will be described in connection with a color television system in which signals, each representative of one of the primary color components of the individual picture elements of the image televised, are transmitted over a single carrier medium in so-called "dot-sequential" arrangement.

In the so-called "dot-sequential" system for transmitting a color television image, the image to be transmitted is analyzed dot-by-dot by means of a sampling technique producing a series of pulses of video signal energy with the amplitude of each such pulse being determined by the ordinate of the video signal at the precise instant at which the pulse is developed. For example, three component color signals may be respectively developed by three separate camera tubes and the signal which is produced by each of the camera tubes and which is continuously present, is sampled in some preferred manner so as to yield a component-color pulse train. By means of multiplexing, the three component-color pulse trains are interleaved into a composite-color pulse train.

The composite-pulse train is then filtered by means of a suitable low pass filter and thereafter transmitted in any suitable manner. Because of the frequency band limitation imposed by the low pass filter, the video wave produced at the transmitter in the above described system is effectively a composite sine wave superimposed on a unidirectional reference component. The said sine wave has a frequency equal to the frequency at which each of the color signals is sampled and the said reference component and the amplitude and phase position of the sine wave are determined by the magnitudes of the component color pulses. At the receiver position the incoming video signal is supplied to a suitable sampling or equivalent system by means of which there are derived therefrom the individual three color components each bearing the desired color information.

Since in the transmitted video signal, the color information is sampled at equal time intervals, each color component in effect utilizes one-third of the available transmission facilities.

In the foregoing and following discussion it is assumed that the three component signals sampled at the transmitter correspond to a primary color system made up of the green, red and blue color components of the image to be televised. However, as is well known from the principles of colorimetry, a given visual sensation may be equally produced by other primary color systems the components of which are suitably selected to produce the required values of luminosity and chromaticity. Furthermore, the spectrum distribution of the green signal can be made to approximate the response characteristic of the eye, whereby this signal approaches the characteristics of a panchromatic signal and the transmission system may readily be modified to utilize such a green signal as a luminosity or brightness signal indicative of image detail with improvement of the resultant image. In such a modified arrangement appropriate red minus luminosity and blue minus luminosity signals are utilized for establishing the chromatic characteristics of the image.

It has been found that physiologically, the human eye is relatively insensitive to color in fine areas. Furthermore, in practice it appears that the eye is less sensitive in distinguishing detail presented in certain colors than it is in distinguishing detail presented in other colors. In other words it seems that the eye is less sensitive to changes in chromaticity than to changes in brightness and thus requires less information pertaining to chromaticity.

Because of this behavior peculiar to the eye, an equal utilization of the transmission channel by each of the three primary color component signals is not a most efficient utilization of the available transmission channel. More particularly, if it be assumed that the color television information is to be transmitted over a channel which has a band width of 4 megacycles per second, an equal utilization of this channel by the three primary color component signals would mean that each component signal contains information corresponding to a frequency band having a maximum value of approximately 1.34 megacycles per second. Such a frequency band when considered in relation to present transmission standards of 30 pictures per second, corresponds to a picture definition with approximately 89,000 picture elements. On the basis of brightness information resolvable by the eye this degree of definition is considerably below that necessary to produce an acceptable image at the television receiver. On the other hand, on the basis of chromaticity information resolvable by the eye, this degree of definition is greater than that necessary to satisfy the eye.

It is an object of the invention to provide a system for transmitting and receiving information utilizing the full potentialities of the frequency spectrum available in the transmission medium.

It is another object of the invention to provide signal transmission systems by means of which a plurality of signals representing given intelligence components may be transmitted over a channel of given band width to produce maximum usable information at a receiving position.

A specific object of the invention is to provide signal transmission systems particularly applicable to color television, in which systems a maximum of information concerning fine details of an image to be televised is transmitted to the receiving position and only sufficient information concerning the chromaticity of the image is transmitted.

Another object of the invention is to provide a transmission receiving system for a plurality of intelligence signals in which system there occurs a minimum of detectable interference between the respective intelligence signals.

These and further objects of the invention will appear as the specification progresses.

The foregoing objects are achieved in accordance with the invention, by means of a system in which two signals each representative of given intelligence are transmitted simultaneously over a single channel. By combining the signals in a given specific manner at the transmitter position and by separating the signals in a complementary manner at the receiver position, the original information contained in each signal may be derived without there occurring significant contamination of one signal by the other. More particularly, and in one aspect of the invention, a first carrier wave of given frequency and phase is modified by a first intelligence component to be transmitted. The modified first carrier is combined with a second carrier wave modified by a second intelligence component and having the same frequency as the first carrier wave but having a phase in quadrature with the first carrier wave. At the receiving position there is provided a sampling system or its equivalent, which samples the first carrier at its peak voltage points and the second carrier at its zero voltage points thus producing an output voltage indicative of the peak values of the first carrier wave and correspondingly the first intelligence. By means of a second sampling sysem operating in phase quadrature to the first and which samples the second carrier at its peak voltage values and the first carrier at its zero voltage values, a second output voltage is produced indicative of the peak values of the second carrier wave and hence indicative of the second intelligence.

In another aspect of the invention, as particularly applied to a color television system in which the image elements are reproduced by three component signals which may each be indicative of a primary color component of the color of the image elements or which may be indicative of the luminosity and chromatic aspects of the image elements, there is provided a suitable sampling or equivalent system by means of which two of the component signals are added together to produce a first carrier wave of given frequency and phase and having a reference level and amplitude proportional to the intensities of the so combined component signals. There is further provided a second sampling or equivalent system by means of which the third component signal is modified to produce a second carrier wave of the said given frequency and in phase quadrature to the first carrier wave and having an amplitude proportional to the amplitude of the third component signal. The two carrier waves so produced are combined to produce a resultant wave which is transmitted over a suitable channel and at the receiving position the original intelligence components are restored by means of complementary sampling systems.

In a further aspect of the invention as particularly applied to a color television system as above outlined, there is provided means by which one of the component signals provides a reference wave having amplitude variations proportional to the variations of the said component signal. There is further provided a sampling or equivalent system by means of which the remaining two component signals are converted into two carrier waves displaced in phase quadrature and each having a substantially zero reference level and an amplitude proportional to the intensity of the respective component signal. The three waves so produced are combined and bring about an output wave at the carrier frequency having a variable reference level and variable amplitude and phase as determined by the amplitudes of the original component signals. By means of a complementary sampling system at the receiver position, the original intelligence is recovered.

As a further feature of the invention the band width of one or more of the component signals is so correlated with respect to the allowable band width of the transmission channel and the frequency of the carrier wave as to permit a greater band width for another component signal carrying a greater desired degree of information without exceeding the capabilities of the transmission channel and without introducing significant contamination of the component signals.

Figure 2:
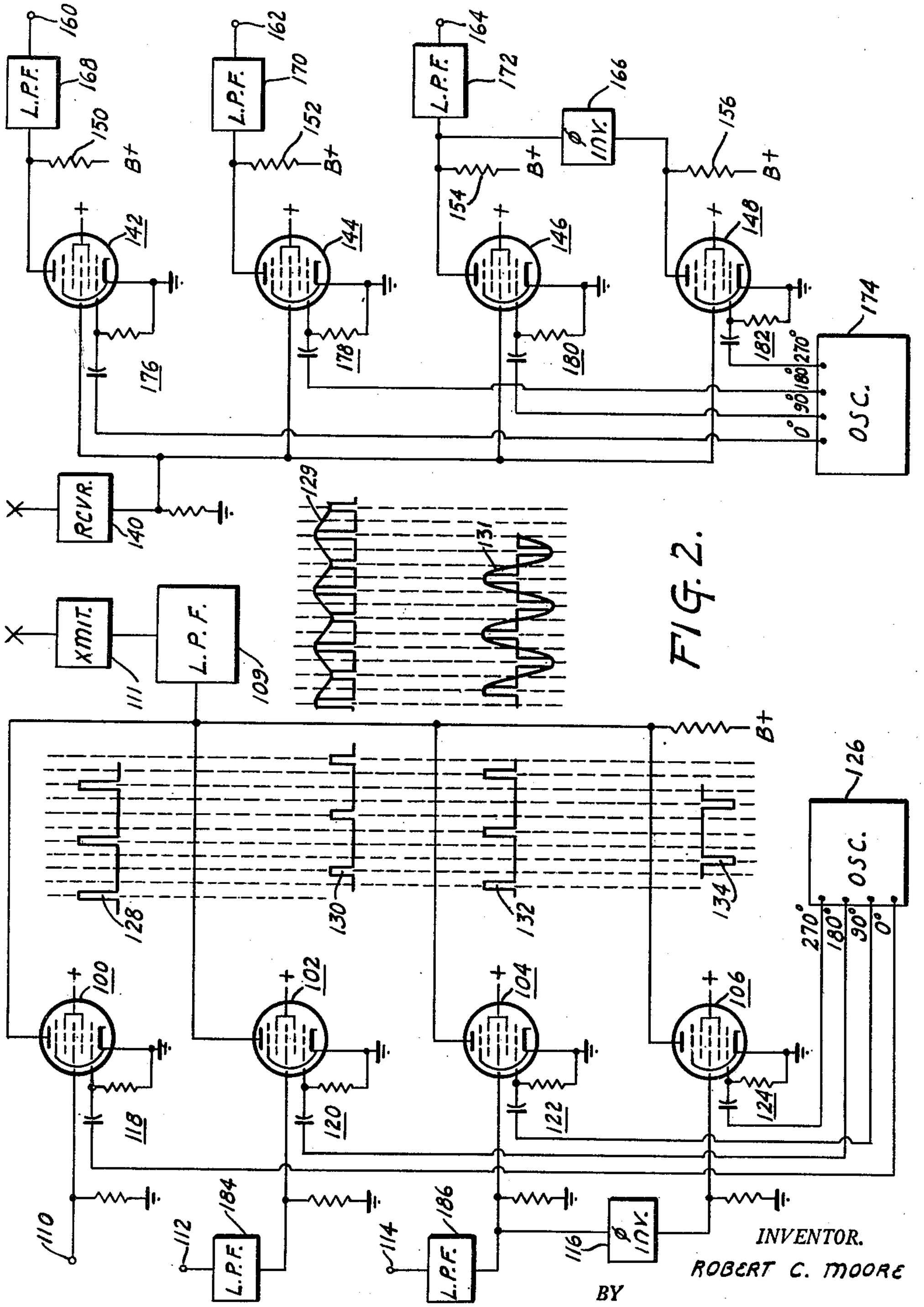
Figure 3:
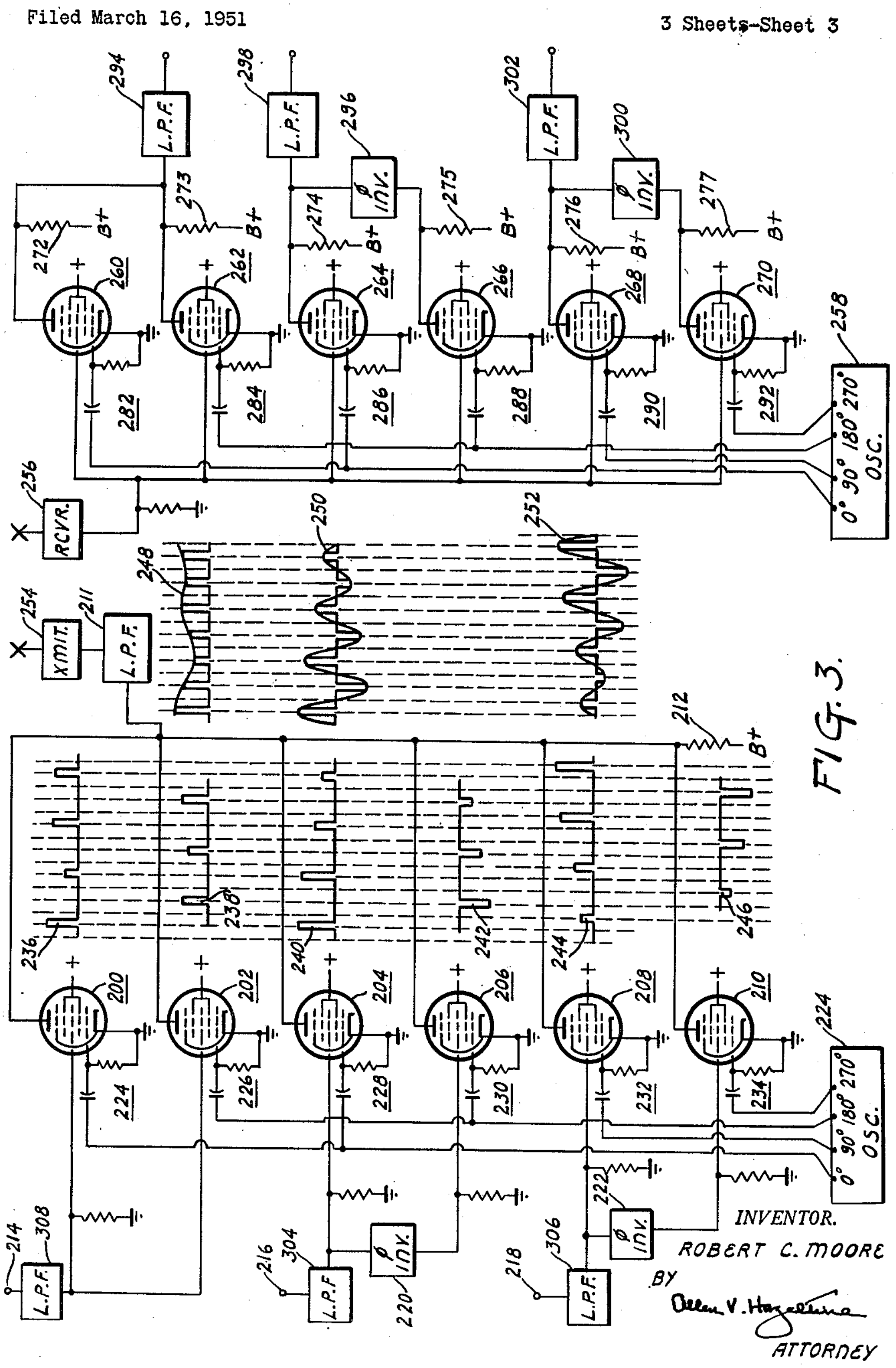

The invention will be described in greater detail with reference to the appended drawings forming part of the specification and in which:

Figure 1 is a schematic diagram of a signal transmission system in accordance with the invention, Figure 2 is a schematic diagram of a system in accordance with a second embodiment of the invention particularly applicable for the transmission and reception of color television signals, and Figure 3 is a schematic diagram of a system in accordance with a third embodiment of the invention and applicable for the transmission and reception of color television signals.

Referring to Figure 1, the system there shown comprises first and second sampling tubes 10 and 12 respectively, which operate to sample in sequence signal waves appearing at input terminals 20 and 22 respectively. Sampling tube 10 may comprise a pentagrid vacuum tube which has its suppressor and cathode grounded, its second and fourth grids connected to a suitable source of positive screen potential, its third grid supplied with the signal wave from terminal 20, its first grid supplied with a sampling signal for rendering the tube conductive only during predetermined portions of the sampling signal, and its anode connected to a source of positive potential designated B+ through a load resistor 14.

Sampling tube 12 may be substantially identical with sampling tube 10, being supplied at its third grid with the signal wave from input terminal 22, and having its anode connected to the source of potential B+ through the common load resistor 14. By supplying each of the sampling tubes, at the first grids thereof, with sampling signals derived from an oscillator source 16 and whose positive peak values occur in 90° phase relationship, the sampling tubes are made conductive in consecutive order. The design of oscillator source 16 conforms to the usual practice and the two sampling voltages in phase quadrature may be derived therefrom in well known manner, for example by suitable phase shifting networks embodied in the oscillator source.

In order to maintain sampling tubes 10 and 12 non-conductive except during the period when the sampling signals applied thereto have high positive peak values, suitable resistance-capacitance networks may be contained in the first grid circuits of these tubes. More particularly, sampling tube 10 is provided with a resistance-capacity network 18 having a time constant sufficiently long compared to the period of the sampling signal from the source 16, so that leveling upon peaks of the sampling signal supplied thereto takes place and conduction through the sampling tubes occurs only during a predetermined brief interval surrounding the time at which the sampling signal attains its peak values. A similar network 19 is provided in the first grid circuit of the tube 12.

The output voltage appearing across the load resistor 14 and derived from the sampling tube 10 consists basically of a series of pulses each having a duration substantially equal to the length of the conducting period of the sampling tube and recurring at the frequency of the sampling signal from the source 16. Successive pulses have amplitude values determined by the amplitude of the signal wave applied at the input terminal 20. These pulses have been shown in the curve adjacent to the sampling tube 10 and are indicated by the numeral 24.

In similar manner, the output voltage derived from the sampling tube 12 consists basically of a series of pulses each having a duration substantially equal to the length of the conducting period of the sampling tube 12 and recurring at the frequency of the sampling signal. The amplitude values of these pulses are determined by the amplitude of the signal wave at the input terminal 22 at the instant of sampling. These pulses have been shown in the curve adjacent to the tube 12 and are indicated by the numeral 26. As will be noted, the pulses 26 occur at a time one-fourth of a cycle later than the pulse 24 in view of the quadrature displacement of the peaks of the sampling signals from the source 16.

The pulses 24 and 26 are supplied to a filter 28 which effectively converts each series of pulses into corresponding sine waves having a frequency equal to the sampling frequency and having a phase quadrature relationship. These sine waves have been superimposed on the pulses 24 and 26 and are shown in Figure 1 as 30 and 32 respectively. Since the two sine waves 30 and 32 are in phase quadrature and are algebraically added together by the filter 28 the output of the filter will be a single resultant sine wave having an amplitude and phase proportional to the amplitudes of the sine waves 30 and 32.

The resultant sine wave when produced by a source 16 of the desired transmission carrier frequency may be transmitted to a receiving position in any suitable manner.

At the receiver position there is provided a complementary sampling system by means of which the original intelligence components are recovered. More particularly, at a receiver position 40 a resultant wave exists similar to that appearing at the output of the filter 28 and this wave is applied to the two sampling tubes 42 and 44. Sampling tubes 42 and 44 may be similar to sampling tubes 10 and 12 each being provided with a third grid to which the received wave is applied, a first grid to which a sampling signal is applied and an anode which is energized from the B+ supply through individual load resistors 46 and 48 respectively.

Resistance-capacitance networks 50 and 52 are contained in the grid circuits of the respective tubes 42 and 44 to limit the conduction period of the tubes to the intervals during which the peak positive values of the sampling signals occur. As a source of sampling signals for the tubes 42 and 44 there is provided an oscillator 54 similar to and operating at the same frequency as the oscillator source 16 and providing two sampling signals at 90° phase relationship.

The sampling tubes 42 and 44 operate to sample the wave at the position 40 in sequence and at time intervals displaced by 90° of the period of the sampling signal. Thus sampling tube 42 samples the received wave at the instant thereof corresponding to the peak amplitude value of the wave 30, at which time the wave 32 has a zero value. At an interval 90° later, the tube 44 samples the received wave and at this time the amplitude value thereof corresponds to the peak value of the wave 32 and zero value of the wave 30.

The voltage appearing across the load resistors 46 and 48 of the respective sampling tubes is basically constituted by a series of pulses which correspond to the pulses 24 and 26 respectively and occur at the sampling frequency rate. By means of low pass filters 56 and 58, these pulses are integrated and signal waves corresponding to the signal waves at input terminals 20 and 22 are produced at the output terminals 60 and 62 respectively.

In the system above described the band width of the filter 28 is the allowable band width of the transmission channel and in an illustrative example, the channel may have a band width from 3 to 4 mc./sec. With a dual side band system operating with the above-noted channel band width, the sampling signal source 16 may have a frequency of 3.5 mc./sec. and the band width of each of the signal waves at the inputs 20 and 22 may extend from 0 to 0.5 mc./sec.

By a suitable selection of the frequency of the sampling signal source 16, whereby one side band of the output wave is partly or wholly suppressed, an amount of intelligence greater than above indicated may be transmitted over the system of Figure 1. More particularly, with a transmission system having an allowable band width of 1 mc./sec. as previously described and as determined by the 3–4 mc./sec. filter 28, and by the use of a sampling source 16 having a frequency of 3.75 mc./sec., input signal waves having a spectrum extending to approximately 0.75 mc./sec. may be transmitted over the system. Under these conditions the component waves 30 and 32 which make up the resultant wave at the output of the filter 28 may each be considered as a carrier wave of 3.75 mc./sec. with an attendant lower side band spectrum determined by the frequency components of the respective signal waves at the inputs 20 and 22. In such a suppressed side band system the carrier waves are in effect each phase modulated to a certain degree at a rate determined by the modulation frequency and, because of the phase shifts so introduced, a certain degree of interaction may occur when the component waves 30 and 32 are added together in the filter 28. The degree of contamination of one wave by the other in such a system is largely determined by the maximum frequency value of the respective signal waves at the input terminals 20 and 22.

In certain instances, for example, as is later more fully discussed in connection with the embodiments of the invention shown in Figures 2 and 3, the information required at the receiving position may be supplied by means of a first signal having a rather large frequency spectrum and a second signal having a relatively small frequency spectrum. In such instances the advantages of the system shown in Figure 1, whereby one side band is partly or wholly suppressed, may be achieved without significant contamination of the respective signals, by limiting the band width of one of the input signal waves to a desired amount for example, by means of a low pass filter 36. Under these conditions the wide band signal component of the output wave of filter 28 is not significantly contaminated by the narrow band signal component. By a suitable selection of the cut-off frequency of the filter 58 at the receiver the effects of the wide band signal on the narrow band signal may be minimized. In a practical arrangement of a suppressed side band system having a channel width of 1 mc./sec. and a sampling frequency of 3.75 mc./sec., the filters 36 and 58 may have a cut-off frequency of .5 mc./sec.

Referring now to Figure 2, the system there shown comprises four sampling tubes 100, 102, 104 and 106 which may be identical to the sampling tube 10 described in connection with the system shown in Figure 1. Each of the tubes 100, 102, 104 and 106 comprises a first grid to which an individual sampling signal is applied, and an anode connected to a source of positive potential B+ through a load resistor 108 which is common to all of the tubes. The anodes of the tubes are coupled in common to a low pass filter 109 to produce a resultant output wave which in turn is applied to a radio frequency transmitter 111 and modulates the same in conventional manner.

Each of the tubes further comprises a second grid which in the case of the tube 100 is connected to an input terminal 110 serving as a source of one of the signal waves to be transmitted, which in the case of tube 102 is connected to an input terminal 112 serving as a source of a second signal wave to be transmitted, which in the case of tube 104 is connected to an input terminal 114 serving as a source of the third signal voltage to be transmitted, and which in the case of tube 106 is connected to the input terminal 114 through a phase inverter 116.

The tubes each embody in the first grid circuit thereof a resistance-capacitance network whereby the tube is maintained non-conductive except for predetermined brief intervals when the sampling signal applied thereto has a high positive peak value, such networks being shown as 118, 120, 122 and 124 respectively.

The sampling tubes operate to sample the signal voltages in a predetermined sequence and are actuated by appropriate phase related signals derived from a sampling signal oscillator 126. More particularly, sampling tube 100 is actuated by a sampling signal having a phase indicated as 0°, sampling tube 102 is actuated by a sampling signal having a phase indicated as 180°, sampling tube 104 by a sampling signal having a phase indicated as 90°, and sampling tube 106 by a sampling signal having a phase indicated as 270°.

The output of each of the sampling tubes is basically a series of pulses having an amplitude determined by the amplitude of the respective signal waves applied to the third grid thereof and having a repetition frequency determined by the frequency of the oscillator 126. These pulses are shown in the wave forms adjacent to the tubes and are indicated as 128, 130, 132 and 134 respectively. As will be noted the pulses 130 have a phase position displaced by 180° from the phase position of the pulses 128 and, due to the band limiting action of the filter 109, these two sets of pulses effectively combine to produce a substantially sinusoidal wave 129 superimposed on a reference level. As indicated by the wave form shown, the value of the reference level is determined by the absolute values of the amplitudes of the pulses 128 and 130, whereas the amplitude of the sinusoidal wave is determined by the difference in the amplitude values of the said pulses. The frequency of the wave 129 is determined by the frequency of the sampling signal source 126 and in the specific system being described these two frequencies are the same.

The pulses 132 have a phase position of 90° relative to the phase position of pulses 128 whereas the pulses 134 are displaced 180° from the pulses 132 and, because of the phase inverter 116, have a negative polarity relative to pulses 132. Upon combining pulses 132 and 134, and due to the band limiting action of filter 109, there will be produced a sinusoidal wave 131 with zero reference level and an amplitude proportional to the amplitude of the signal voltage at input terminal 114. It will be seen that the wave 131 has the same frequency as wave 129 and is displaced 90° relative to wave 129. These waves may therefore be combined in the manner discussed in connection with Figure 1 to produce an output wave having an amplitude and phase determined by the amplitudes of the waves 129 and 131. The resultant wave appearing at the output of filter 109 has a reference level component as determined by the absolute magnitudes of the signals at input terminals 110 and 112 and a sinusoidal component at the sampling frequency having an amplitude and phase determined by the amplitude of the signal at input terminal 114 and the amplitude difference of the signals at input terminals 110 and 112.

At the receiver location the original intelligence may be recovered by a complementary sampling system and for this purpose a wave having the form of that existing at the output of filter 109 is derived from a receiver 140 and applied to each of sampling tubes 142, 144, 146 and 148. Sampling tube 142 may be similar to the sampling tubes previously described and may comprise a first grid to which a sampling signal is applied, a third grid to which the wave from receiver 140 is supplied and an anode energized through a load resistor 150. Tubes 144, 146 and 148 may be similar to tube 142, the anodes of each thereof being energized through load resistors 152, 154 and 156 respectively. As will be seen from the drawing, tube 142 serves to supply one output terminal indicated as 160, tube 144 serves to supply a second output terminal indicated as 162 and tubes 146 and 148 are interconnected by a phase inverter 166 to supply a third output terminal indicated as 164. Suitable low pass filter elements 168, 170 and 172 may be provided in the respective output circuits to limit the frequency spectrum of each output signal.

The sampling tubes operate to sample the wave from the receiver 140 at predetermined time intervals in synchronism with the sampling process at the transmitter, and for this purpose there is provided a sampling signal oscillator 174 adapted to produce four sampling voltages displaced 90° relative to each other and having a frequency equal to the frequency of the oscillator 126. Tube 142 is supplied with a sampling signal indicated as 0°, tube 144 with a sampling signal at 180°, tube 146 with a sampling signal indicated as 90°, and tube 148 with a sampling signal indicated at 270°. Each of the tubes is arranged to be conductive only during the positive peak values of the respective sampling signal, and for this purpose the first grid circuits thereof embody resistance-capacitance networks 176, 178, 180 and 182 respectively, which operate in the same manner as the similar networks previously described.

Tube 142 serves to sample the incoming wave from the receiver 140 at instants thereof corresponding to the positive peaks of the wave 129 whereby there is formed at the load resistor 150 a series of pulses corresponding to the pulses 128 originally derived from the signal applied to input terminal 110. Similarly tube 144, which is made conductive at an interval one-half cycle later than tube 142, samples the received wave at instants corresponding to the troughs of the wave 129 so that there is formed at the load resistor 152 a series of pulses corresponding to the pulses 130. Tubes 146 and 148 sample the received wave at instants in phase quadrature to the sampling by tubes 142 and 144 to produce, at the respective load resistors 154 and 156, pulses which correspond to the pulses 132 and 134 respectively but which have an enhanced amplitude proportional to the reference level of the wave 129. By means of the phase inverter 166 this reference level component is effectively cancelled at the output terminal 164.

It is thus seen that by means of the system of Figure 2 three input signal voltages may be transmitted over a single channel without there occurring significant contamination or cross-talk between the respective voltages. More particularly by reason of the sampling and desampling actions of the tubes 100, 102, 142 and 144 which take place at 180° intervals of the sampling cycle, the input waves at terminals 110 and 112 may be combined, transmitted and thereafter separated to obtain output signal waves substantially identical to the input signal waves. Furthermore, by sampling the signal at terminal 114 in a manner to produce a carrier wave in quadrature with the wave produced by tubes 100 and 102 and having a substantially zero reference value, and by means of the phase inversion process at the receiver, the original input wave is reproduced without there occurring therein contaminating components otherwise produced by the reference level component of the wave 129.

The embodiment of the invention shown in Figure 2 is particularly suitable for single channel transmission and reception of three signal waves of the type produced in a dot-sequential three color television system. As previously pointed out, it appears that the eye is less sensitive to changes in chromaticity than to changes in brightness. Accordingly, the full requirements of the eye may be satisfied in a color television system by means of a first image component signal containing information concerning the brightness of the image and having a relatively wide frequency spectrum and by two additional component signals with information concerning image chromaticity and having relatively narrow frequency spectra. The system shown in Figure 2 is capable of transmitting maximum detectable information in conformance with the above principles.

The heretofore proposed dot-sequential systems for transmitting a color television signal make use of a time multiplex system in which the color components defining the green, red, and blue aspects of the image, or correspondingly the three components defining luminosity and chromaticity, are sampled in a symmetrical arrangement which treats each signal alike. If the number of signal samples taken per second is greater than twice the maximum allowable band-pass frequency of the transmission channel, there will be cross-talk between the samples because each sample will not attain a zero value by the time the succeeding sample is taken. In a three color television system with symmetrical sampling, each signal must be sampled at no greater rate than two-thirds the maximum band-pass frequency of the channel if cross-talk is to be avoided. On the other hand, in order to transmit the desired picture detail it is necessary to use a sampling frequency which produces signal samples at a rate greater than the above noted critical value.

The system illustrated in Figure 2 makes use of non-symmetrical sampling. More particularly, as will be noted, the signals at terminals 110 and 112 are sampled at 180° intervals once each sampling cycle and the signal at terminal 114 is sampled in quadrature to the first two signals and twice each sampling cycle.

In the non-symmetrical sampling as shown in Figure 2, the sampling frequency for the waves at input terminals 110 and 112 is equal to the maximum band frequency of the transmission channel as determined by the filter 109. Thus, for a given maximum frequency of the transmission channel, a higher sampling frequency may be used while still permitting the individual samples to attain a zero value prior to the occurrence of the succeeding sample and with zero cross-talk between the waves of input terminals 110 and 112. The wave from the input terminal 114 is sampled in quadrature to the waves at terminals 110 and 112 and components of the wave or terminal 114 may be introduced into the signal produced by the two waves from terminals 110 and 112. However, because of the inversion of the polarity of the third wave by the phase inverter 116 each succeeding sampling period, and because of the absence of a second inversion in the receiver systems supplying the output terminals 160 and 162, the components of the third wave so introduced into the first and second waves are effectively cancelled at the receiver position.

The above described action may be modified to a certain extent because of the suppression of one side band of the composite wave by the filter 109. However, as pointed out in connection with the embodiment of the invention illustrated in Figure 1, the cross-talk brought about by suppressing the side band may be minimized by suitably limiting the maximum frequency of the wave at terminal 114, for example by low pass filter 186. Since in a color television system this wave may be used to transmit information to which the eye is relatively insensitive, a limiting of its maximum frequency does not produce visual deterioration of the color information. In a specific example, in which the transmission channel has an allowable band width of 4 megacycles, the system shown in Figure 2 permits the use of a sampling frequency of 4 mc./sec. without serious cross-talk when the signal at input terminal 114 is limited to a maximum frequency of 1 mc./sec., and the filter 172 has a corresponding cut-off value.

The system shown in Figure 3 illustrates another embodiment utilizing the principles of the invention. The system shown comprises six sampling tubes shown as 200, 202, 204, 206, 208 and 210, which may be identical to the sampling tubes heretofore described and which have their anodes energized through a common load resistor 212 and connected to a low pass filter 211 which defines the band width of the transmission channel. The three signal waves to be sampled are applied to input terminals 214, 216 and 218, input terminal 214 being connected to the third grid of each of tubes 200 and 202, input terminal 216 being connected to the third grid of tube 204 and through a phase inverter 220 to the third grid of tube 206, and input terminal 218 being connected to the third grid of tube 208 and through a phase inverter 222 to the third grid of tube 210.

The first grids of each of the tubes are actuated by suitably phase displaced sampling signals derived from a sampling oscillator 224, the sequence of the sampling signals being such that tube 200 is actuated at 0° phase position, tube 202 at 180°, tube 204 at 0° simultaneously with tube 200, tube 206 at 180° simultaneously with tube 202, tube 208 at 90° and tube 210 at 270°. Each of the tubes embodies a resistance-capacitance network whereby the tube is conductive only during the positive peak values of the sampling signals, such networks being shown as 224, 226, 228, 230, 232 and 234 respectively.

The output of each tube is basically a series of pulses having amplitudes proportional to the amplitude of the corresponding input signal wave and occurring at twice the frequency of the sampling signals. These pulses have been shown in the wave forms adjacent to each tube as 236, 238, 240, 242, 244 and 246 respectively. In the case of tubes 200 and 202, the output pulses have the same polarity and because of the band limiting action of the filter 211, these pulses combine to produce a reference level wave having an envelope corresponding to the envelope of the wave initially applied to terminal 214 such as indicated at 248. Since the input signal to tube 204 is applied in opposite polarity to tube 206, the output pulses of these tubes effectively combine to produce a sine wave at the frequency of the sampling signal and having a zero reference level and an amplitude proportional to the amplitude of the signal at terminal 216 as indicated at 250. Similarly, the input signal to tube 208 is applied in opposite polarity to tube 210 and the output pulses of tubes 208 and 210, by reason of the band limiting action of the filter 211, combine to produce a sine wave 252 at the frequency of the sampling signal, which wave has a zero reference level, an amplitude proportional to the amplitude of the input signal at terminal 218 and bears a quadrature relationship to the wave 250.

There will thus appear at the output of filter 211 a composite wave having a reference level as determined by the wave 248 and having an amplitude and phase of sine wave component as determined by the amplitudes of the waves 250 and 252. This composite wave serves to modulate a transmitter 254 in any conventional manner.

At the receiving position the composite wave is recovered from a receiver 256 and applied to the sampling tubes 260, 262, 264, 266, 268 and 270, by means of which a complementary sampling operation is performed. The sampling tubes may be pentagrid tubes identical to those previously described and each embodies an individual load resistor through which the anode is energized and a long time constant resistance-capacitance network connected to the first grid thereof, whereby the tube is made conductive solely during the positive peak of the sampling signal applied thereto. The load resistors are shown as 272, 273, 274, 275, 276 and 277 and the resistance-capacitance networks as 282, 284, 286, 288, 290 and 292 respectively.

The composite signal from the receiver is applied to the third grid of each of the tubes whereas sampling signals derived from a generator 258 operating at the frequency of the generator 224 and bearing a predetermined phase relationship are supplied to the first grid of the tubes, tube 260 being energized by a sampling signal at 0° phase, tube 262 by a sampling signal at 180° phase, tube 264 by a signal at 0° phase, tube 266 by a signal at 180° phase, tube 268 by a signal at 90° phase, and tube 270 by a signal at 270° phase.

The output of tube 260 will be basically a series of pulses having an amplitude proportional to the sum of the amplitudes of the pulses 236 and 240 whereas the output of tube 262 will be a series of pulses having an amplitude proportional to the difference in amplitudes of the pulses 238 and 242. In effect, therefore, the wave at the input of a low pass filter 294, which is common to the anodes of tubes 260 and 262, will be a composite wave having a reference level and a superimposed sine wave component. The latter component is suppressed by the filter 294 so that only the reference level component remains, which component is thus similar to the signal originally applied to input terminal 214.

The output pulses of the tube 264 are similar to those of the tube 260 and the output pulses of tube 266 are similar to those of tube 262. However, by means of a phase inverter 296 interconnecting the anodes of tubes 266 and 264, the reference level component brought about by the signal from terminal 214 is cancelled and the subsequent passage of the resultant signal through a low pass filter 298 produces an output voltage similar to the voltage applied to terminal 216.

Since the sampling by tubes 260, 262, 264 and 266 takes place at instants when the wave 252 is at zero potential, there will be no component of the wave at the terminal 218 in the outputs of filters 294 and 298.

The output pulses of the tubes 268 and 270 will be similar to those derived from tubes 208 and 210 and will contain a reference level component which is derived from the wave 248. This component is cancelled by a phase inverter 300 interconnecting the anodes of tubes 268 and 270, and, by means of a low pass filter 302, an output wave similar to that initially applied to the terminal 218 is produced.

As will be noted, the system shown in Figure 3 is a non-symmetrical sampling system as pointed out in connection with the system shown in Figure 2. Accordingly, the same advantages are attained as above outlined. Thus in the specific embodiment illustrated in Figure 3, in which the pass band of the transmission channel is 0 to 4 mc./sec. as determined by filter 211, the sampling frequency of the oscillators 224 and 258 is 4 mc./sec.

Since with the above-given specific values the sampling frequency of oscillator 224 is substantially at the cut-off frequency of the low pass filter 211, one side band of the resultant wave produced by waves 250 and 252 will be suppressed almost entirely and a phase modulation component, as determined by the frequencies of the input signal waves, may be introduced. For a color television system wherein only one signal wave need be of large band width and the remaining signal waves can be limited in their maximum frequency without visual deterioration of the image, cross-talk due to such phase modulation may be reduced to a tolerable value by suitably limiting the frequency range of the latter waves. Thus in the system shown in Figure 3 there may be provided for this purpose a low pass filter 304 to which the signal from input terminal 216 is applied, and a low pass filter 306 to which the signal from input terminal 218 is applied.

For the specific operating conditions described in Figure 3, filter 304 may have a pass band of 0 to 2 mc./sec. and filter 306 may have a pass band of 0 to 1 mc./sec. At the receiver location filters 298 and 302 may have the same respective band widths.

In some instances, particularly in view of the band pass limiting action of filter 294 it may be desirable to correspondingly limit the pass band of the signal at input terminal 214, and for this purpose there is provided a low pass filter 308 having similarly a band pass of 0 to 3.8 mc./sec.

With the specific frequency values given in connection with the embodiment shown in Figure 3, it will be noted that the rate of occurrence of the pulses 236 and 238 in combination is greater than the maximum transmission frequency of the filter 211. Under these conditions the filter 211 substantially restores the wave form of the signal wave originally applied to the third grids of sampling tubes 200 and 202. Under these conditions the sampling tubes 200 and 202 may be eliminated if desired and the output of filter 308 may be connected directly to the input of filter 211. Such a modification, whereby the output of filter 308 is connected directly to the input of filter 211, may be indicated in those instances when it is unnecessary to use dot-interlace principles for improvement of image resolution. Similar considerations apply at the receiver position, where the sampling tubes 260 and 262 may be eliminated and the output of the receiver 256 may be directly connected to the input of filter 294.

While I have described my invention by means of specific examples and in specific embodiments, I do not wish to be limited thereto, for obvious modifications will occur to those skilled in the art without departing from the spirit and scope of the invention.

What I claim is:

1. A signal transmission system comprising individual input channel means for three intelligence signals, first and second sampling systems, means to actuate said sampling systems substantially in phase quadrature at a given carrier frequency, one of said sampling systems upon actuation being adapted to produce an output signal at said carrier frequency having an amplitude reference level independent of the amplitude of an input signal applied to the said sampling system and having amplitude variations about said reference level determined by the amplitude of the said applied input signal, means for coupling a first of said input channels to said one sampling system to thereby produce a first output signal at said carrier frequency having amplitude variations determined by the amplitude of a first of said intelligence signals, means for coupling a second of said input channels to said other sampling system to thereby produce a second output signal, means to couple the third of said input channels to the said second output signal to produce a first resultant signal having an amplitude reference level and amplitude variations at said carrier frequency determined by the amplitudes of said second and third intelligence signals, and means to supply said first output signal and said resultant signal to a common transmission channel to thereby produce an output wave having reference level and amplitude variations proportional to the amplitude variations of said intelligence signals and having side band components each having a frequency spectrum determined by the frequency spectra of said intelligence signals.

2. A signal transmission circuit as claimed in claim 1 comprising means coupled to one of said input channels to partially suppress the frequency spectrum of one of said intelligence signals, and means coupled to said common transmission channel to at least partially suppress the spectrum of one of said side band components.

3. A signal transmission system as claimed in claim 1 wherein said sampling system adapted to produce an output signal at said carrier wave having an amplitude reference level independent of the amplitude of an applied input signal, comprises two sampling elements having individual input circuits and common output circuits and means to apply said first intelligence signal to the input circuit of one of said sampling elements in a given phase and to the input circuit of the other of said elements in phase opposition to said given phase, wherein said second sampling system comprises a third sampling element having an input circuit and an output circuit and means to apply said second intelligence signal to the input circuit of said third sampling element, and wherein said means to couple said third input channel to said second output signal comprises a fourth sampling element having an input circuit and an output circuit, means to apply said third intelligence signal to the input circuit of said fourth sampling element, and means to actuate said fourth sampling element at said carrier frequency in phase opposition to the actuation of said third sampling element.

4. A signal transmission system comprising an input channel for an input wave comprising two carrier wave components having the same frequency and arranged substantially in phase quadrature and a third component establishing a reference level for said carrier wave components, one of said carrier wave components being indicative of the value of one intelligence signal and the other of said carrier wave components and said reference level component being indicative of the values of two other intelligence signals, a first transmission path coupled to said input channel, a sampling system adapted to produce an output signal having amplitude variations determined by amplitude variations of a wave applied thereto and substantially independent of reference level variations of said applied wave, means for coupling said sampling system to said first transmission path to thereby apply said input wave to said sampling system, means to actuate said sampling system at said carrier frequency at given phase intervals to thereby derive from said input wave a first intelligence signal having an amplitude determined by the amplitude of one of said carrier wave components, a second transmission path coupled to said input channel, and means to derive from said second transmission path second and third intelligence signals having amplitudes determined by the amplitude of the other of said carrier wave components and the amplitude of said reference level component, said latter means comprising a second sampling system and means to energize said second sampling system at said carrier frequency in phase quadrature to the actuation of said first sampling system.

5. A signal transmission circuit as claimed in claim 4 in which the frequency spectrum of one of the side band components of said input wave is at least partially suppressed relative to the frequency spectrum of the other of the side band components of said input wave, and further comprising means coupled to the output of one of said sampling systems to partially suppress the spectrum of the intelligence signal produced by the said sampling system.

6. A signal transmission system as claimed in claim 4 wherein said sampling system adapted to produce an output signal having amplitude variations determined by amplitude variations of a wave applied thereto substantially independent of reference level variations of said applied wave comprises two sampling elements actuated in phase opposition at said carrier frequency, said sampling elements having common input circuits and individual output circuits, and means to interconnect the said output circuits in phase opposition, and wherein said means to derive from said second transmission path two intelligence signals having amplitudes determined by the amplitude of the said other carrier wave component and the amplitude of the said reference level component comprises third and fourth sampling elements having input circuits coupled to said input channel and having individual output circuits, said third and fourth sampling elements being actuated in phase opposition relative to each other and in phase quadrature relative to said first and second sampling elements.

7. A signal transmission system, comprising a first channel for a first intelligence signal having a varying amplitude and having a given frequency spectrum, a second channel for a second intelligence signal having a varying amplitude and having a second given frequency spectrum, first and second sampling means each having an input circuit and an output circuit, a source of a wave of given frequency, means to couple said first and second channels to a respective one of the input circuits of said sampling means, means to couple the output circuits of said sampling means in common to a third channel, means to actuate said sampling means substantially in phase quadrature at the frequency of said wave to thereby produce in said third channel a carrier wave having side band components each having a frequency spectrum determined by the frequency spectra of said intelligence signals, and means coupled to said third channel to at least partially suppress the frequency spectrum of one of said side band components relative to the frequency spectrum of the other of said side band components.

8. A signal transmission system as claimed in claim 7 further comprising means coupled to said first channel to partially suppress the frequency spectrum of said first intelligence signal.

9. A signal transmission system comprising an input channel for an input wave comprising two carrier wave components having the same frequency and arranged substantially in phase quadrature, the frequency spectrum of one of the side band components of said input wave being at least partially suppressed relative to the frequency spectrum of the other of the side band components of said input wave, said carrier wave components being each indicative of the value of an intelligence signal, first and second sampling means having input circuits connected in common to said input channel and having individual output circuits, means to actuate said sampling means substantially in quadrature phase relationship at the frequency of said carrier wave components thereby to produce a different intelligence signal in each of the said output circuits, and means coupled to the output circuit of one of said sampling means to partially suppress the frequency spectrum of the intelligence signal produced in the said output circuit.

10. A signal transmission system comprising individual input channel means for three intelligence signals, first and second sampling systems, means to actuate said sampling systems substantially in phase quadrature at a given carrier frequency, each of said sampling systems upon actuation at said carrier frequency being adapted to produce an output wave at said carrier frequency having an amplitude reference level independent of the amplitude of the input signal applied to said sampling system and having amplitude variations determined by the amplitude of the said applied input signal, means for coupling a first of said input channels to one of said sampling systems to thereby produce a first output wave at said carrier frequency having amplitude variations determined by the amplitude of a first of said intelligence signals, means for coupling a second of said input channels to the other of said sampling systems to thereby produce a second output wave at said carrier frequency in phase quadrature to said first output wave and having amplitude variations determined by the amplitude of a second of said intelligence signals, and means to couple said first and second output waves and the third of said intelligence signals to a common transmission channel to thereby produce a resultant wave at said carrier frequency having amplitude and phase variations determined by the amplitude variations of said first and second output waves and having a reference level determined by the amplitude of said third intelligence signal.

11. A signal transmission circuit as claimed in claim 10 wherein said resultant wave has side band components each having a frequency spectrum determined by the frequency spectra of said intelligence signals, and further comprising means coupled to said common transmission channel to at least partially suppress the frequency spectrum of one of said side band components relative to the frequency spectrum of the other of said side band components.

12. A signal transmission circuit as claimed in claim 11 further comprising means coupled to said first input channel to partially suppress the frequency spectrum of said first intelligence signal.

13. A signal transmission system as claimed in claim 10 wherein said first sampling system comprises two sampling elements having individual input circuits and common output circuits and means to apply said first intelligence signal to the input circuit of one of said elements in a given phase and to the input circuit of the other of said elements in phase opposition to said given phase, and wherein said second sampling system comprises two sampling elements having individual input circuits and common output circuits and means to apply said second intelligence signal to the input circuit of one of said latter sampling elements in a given phase and to the other of said latter sampling elements in phase opposition to said given phase.

14. A signal transmission system as claimed in claim 13 wherein said means to couple the said third intelligence signal to the said common transmission channel comprises two sampling elements having input circuits connected in common to the third of said input channels and output circuits connected in common to said common transmission channel and means to actuate said two sampling elements in phase opposition.

15. A signal transmission system comprising an input channel for an input wave comprising two carrier wave components having the same frequency and arranged substantially in phase quadrature and a third component establishing a reference level for said carrier wave components, said components being indicative each of a different one of three intelligence signals, first, second and third transmission paths coupled to said input channel, means coupled to said first path for deriving from said input wave said third component to thereby produce a first output signal having amplitude variations determined by amplitude variations of said reference level component of said input wave, first and second sampling systems, means to actuate said sampling system substantially in phase quadrature at the frequency of said carrier wave components, said sampling systems being adapted to produce output signals having amplitude variations determined by amplitude variations of a wave applied thereto substantially independent of reference level variations of said applied wave, means to couple said second transmission path to one of said sampling systems to thereby produce a second output signal having variations determined by the amplitude variations of one of said carrier wave components, and means to couple said third transmission path to the other of said sampling systems to thereby produce a third output signal having variations determined by the amplitude variations of the other of said carrier wave components.

16. A signal transmission system as claimed in claim 15 in which the spectrum of one of the side band components of said input wave is at least partially suppressed and further comprising means coupled to the output of one of said sampling systems to partially suppress the spectrum of the output signal produced by the said sampling system.

17. A signal transmission system as claimed in claim 15 in which each of said sampling systems comprises two sampling elements having common input circuits and individual output circuits, means to actuate said two sampling elements in phase opposition and means to interconnect the said output circuits of said two sampling elements in phase opposition.

18. A signal transmission system as claimed in claim 17 wherein said means coupled to said first path for producing said first output signal comprises two sampling elements having input circuits connected in common to the said first path and output circuits connected in common to an output channel, and means to actuate said sampling elements in phase opposition.

ROBERT C. MOORE.

References Cited in the file of this patent

UNITED STATES PATENTS

| Number | Name | Date |
|---|---|---|
| 1,928,093 | Coyle | Sept. 26, 1933 |
| 2,021,743 | Nicolson | Nov. 19, 1935 |
| 2,471,253 | Toulon | May 24, 1949 |